(12) United States Patent
Albulet (10) Patent No.: US 7,380,145 B2
(45) Date of Patent: May 27, 2008

(54) MODIFYING A POWER MANAGEMENT ALGORITHM BASED ON WIRELESS COMMUNICATION PARAMETERS

(75) Inventor: Mihai Albulet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 10/720,116

(22) Filed: Nov. 25, 2003

(65) Prior Publication Data

US 2005/0114714 A1    May 26, 2005

(51) Int. Cl.
*G06F 1/26* (2006.01)
(52) U.S. Cl. .............. 713/320; 713/300; 713/323; 713/324
(58) Field of Classification Search .......... 713/300, 713/310, 320, 324, 323; 375/260
See application file for complete search history.

(56) References Cited

U.S. PATENT DOCUMENTS

| | | | |
|---|---|---|---|
| 5,754,890 A | 5/1998 | Holmdahl et al. | |
| 6,366,622 B1* | 4/2002 | Brown et al. | 375/322 |
| 6,442,734 B1 | 8/2002 | Hanson et al. | |
| 6,567,473 B1* | 5/2003 | Tzannes | 375/260 |
| 6,667,991 B1* | 12/2003 | Tzannes | 370/465 |
| 6,807,164 B1* | 10/2004 | Almgren et al. | 370/342 |
| 2001/0040880 A1* | 11/2001 | Chen et al. | 370/337 |
| 2003/0056131 A1 | 3/2003 | Eberhard et al. | |
| 2003/0063343 A1* | 4/2003 | Pheiffer et al. | 359/110 |
| 2003/0197488 A1* | 10/2003 | Hulvey | 320/135 |
| 2003/0197677 A1* | 10/2003 | Hulvey | 345/156 |
| 2004/0202133 A1* | 10/2004 | Filipovic | 370/332 |
| 2005/0059345 A1* | 3/2005 | Palin et al. | 455/41.2 |
| 2005/0136960 A1* | 6/2005 | Timus et al. | 455/522 |
| 2006/0217141 A1* | 9/2006 | Legg et al. | 455/522 |

OTHER PUBLICATIONS

U.S. Appl. No. 10/186,234, Sharma.
U.S. Appl. No. 10/319,470, Ranta.
Manish Anad et al., "Self-Tuning Wireless Network Power Management," Proceedings of the 9th Annual International Conference on Mobile Computing and Networking, San Diego, CA, pp. 176-189, (Sep. 14-19, 2003).
Jyh-Cheng Chen et al., "Performance comparison of battery power consumption in wireless multiple access protocols," Wireless Networks, vol. 5, No. 6, pp. 445-460 (Dec. 1999).
A. Chockalingam et al., "Energy Consumption Performance of a Class of Access Protocols for Mobile Data Networks," VTC '98, pp. 820-824 (1998).
Chris Evans-Pughe, "Is the ZigBee wireless standard, promoted by alliance of 25 firms, a big threat to Bluetooth?" IEE Review, pp. 28-31 (Mar. 2003).

(Continued)

*Primary Examiner*—Thomas Lee
*Assistant Examiner*—Malcolm D Cribbs
(74) *Attorney, Agent, or Firm*—Birch, Stewart, Kolasch & Birch, LLP (57) ABSTRACT

A wireless device determines characteristics of a connection established (or being established) with a remote device and implements a power management algorithm based on those characteristics. The wireless device includes a battery power source, a radio transceiver powered by the battery, a memory and a controller. The controller is configured to create, via the transceiver, wireless connections with remote devices in any of a plurality of connection configurations. The controller detects the presence, in a wireless transmission from a remote device, of one or more parameters identifying one of the plurality of configurations. Based on the configuration identified, the controller implements one of a plurality of power management algorithms.

23 Claims, 8 Drawing Sheets

OTHER PUBLICATIONS

Mahmoud Naghshineh et al., "Power-Aware Routing in Wireless Packet Networks," IEEE, pp. 380-383 (1999).

Christine E. Jones et al. "A Survey of Energy Efficient Network Protocols for Wireless Networks," Wireless Networks, vol. 7, No. 4, pp. 334-358 (Sep. 2001).

Kanishka Lahiri et al., "Battery-Efficient Architecture for an 802.11 MAC Processor," IEEE, pp. 669-674, (2002).

Yen-Wen Lin et al., "Commit Protocol for Low-Powered Mobile Clients," IEICE Trans. Inf. & Sys., vol. E82-D, No. 8, pp. 1167-1179, (Aug. 1999).

Marios Iliopoulos et al., "Design and implementation of a MAC controller for the IEEE802.11 wireless LAN," Int. J. Electronics, vol. 88, No. 3, pp. 271-285 (Mar. 2001).

Yongho Scok et al., "Multi-rate Aware Routing Protocol for Mobile Ad Hoc Networks," 57th IEEE Semiannual Vehicular Technology Conference, pp. 1749-1752 (prior to Nov. 25, 2003).

Igor Sedov et al., "Time and Energy Efficient Service Discovery in bluetooth," 57th IEEE Semiannual Vehicular Technology Conference, pp. 418-422 (prior to Nov. 25, 2003).

Davids Wu, "Wireless keyboard and mouse device based on bluetooth," Proc. SPIE, vol. 4911, pp. 306-316 (2002).

"Specification of the Bluetooth System," version 1.2 (Nov. 5, 2003).

* cited by examiner

MODIFYING A POWER MANAGEMENT ALGORITHM BASED ON WIRELESS COMMUNICATION PARAMETERS

FIELD OF THE INVENTION

This invention relates to power management in electronic devices that communicate via a wireless link.

BACKGROUND OF THE INVENTION

Wireless communication between electronic devices over relatively short distances is a common and increasingly important feature of modern life. In some cases, for example, an electronic device or other appliance is controlled by another electronic device which must communicate instructions to the controlled device (and perhaps receive information from the controlled device). Examples include computer input devices (e.g., mice, trackballs, joysticks, game controllers) and remote control units (for, e.g., televisions or other appliances). In other cases, it is necessary for one electronic device to transmit more complex data to and/or receive such data from another device. Examples include computer keyboards, digital cameras and other devices able to transmit data to a computer or other device. Among other advantages, wirelessly transmitting data and/or control signals can dramatically increase user convenience and reduce clutter from multiple connecting cables.

Although there are several standards for wireless communication, BLUETOOTH is becoming the de facto standard for many applications. Developed by Bluetooth SIG, Inc., the BLUETOOTH wireless specification establishes protocols and standards for two-way wireless communication between electronic devices using relatively low power radio communication. BLUETOOTH is described by, e.g., "Specification of the Bluetooth System" (versions 1.1 and 1.2), "Human Interface Device (HID) Profile version 1.0" and various other documents available from Bluetooth SIG, Inc. at <http://www.bluetooth.com>. Among other things, BLUETOOTH provides for two-way radio links between multiple devices in a short-range radio network called a "piconet."

As one example of a BLUETOOTH piconet, a personal computer may be configured to receive input from one or more wireless input devices such as a wireless mouse and/or a wireless keyboard. In some cases, a user connects a device to the piconet by simply bringing the device within range of the computer's Bluetooth controller. In other cases, more steps may be required so that the device becomes bonded with the computer BLUETOOTH host so as to authenticate the device and establish secure communication between the devices. In either case, a series of inquiry, paging and other messages are exchanged between the input device and the computer to set up a connection over which user data (e.g., mouse movement or button press, keyboard key down, etc.) is transmitted to the computer. In some cases, data from applications or other software executing on the computer is also transmitted over that connection to the input device. Details of the messages exchanged between devices to establish a connection are set forth in the above-referenced BLUETOOTH documents and are known in the art.

To maintain a connection, even when the input device has no user data to transmit, requires a periodic exchange between the input device and the computer. In effect, the input device periodically transmits a message saying "I am still here." The computer responds "OK, you are still on my list," and maintains the connection. Although the interval between user data and/or "I'm here" messages from the input device can be varied, it is generally on the order of tens of milliseconds. If the computer does not receive a message from the input device before expiration of a timeout period, the computer assumes the input device is turned off or absent, and breaks (or "de-lists") the connection with the device. In order for the input device to again communicate with the computer, another series of messages must be exchanged to re-establish the connection.

This can create a conflict with regard to design requirements for a wireless input device such as a computer mouse or keyboard. Because wireless devices are battery powered, it is desirable to reduce the device's power consumption as much as possible so as to prolong battery life. A significant amount of the device power is consumed by the radio transceiver that communicates with the controller. If other considerations are ignored, the period between transmissions should be reduced as much as possible during times when the device is idle, i.e., not actually communicating user data to the computer. If the interval between transmissions is too large, however, the connection to the computer is lost. Although the connection can be re-established, doing so is relatively time-consuming and increases the amount of time needed for user input (e.g., moving a mouse) to cause the appropriate response by the computer (e.g., moving a cursor).

This input-to-response delay, or latency, can be noticeable to a human if it is approximately 100 milliseconds or more. The acceptable amount of perceived latency varies under different conditions and with different users and usage styles. For computers and input devices operating under the earlier version (1.1) of the BLUETOOTH specification, the time to re-establish the connection can be approximately 1 second or more. Under version 1.2 of the BLUETOOTH specification, the reconnect time is reduced, and in some cases may be as little as approximately 250 milliseconds. This is a significant improvement, and may result in acceptable latency in some circumstances. Under other conditions, this may still result in excessive latency. However, the BLUETOOTH specification allows manufacturers to incorporate additional features into a BLUETOOTH-compliant device (whether a computer, an input device or otherwise), so long as those additional features do not prevent that device from providing certain other features that are mandatory for BLUETOOTH compliance. Accordingly, manufacturers are able to develop BLUETOOTH-compliant chipsets providing a re-connect procedure that is faster than the "default" connection procedure of the BLUETOOTH specification.

Unfortunately, advantages of faster BLUETOOTH version 1.2 and proprietary re-connection procedures may not be achievable in many cases. For example, a computer mouse could be equipped with the hardware and firmware necessary to implement a proprietary fast re-connect procedure, but the mouse might be used with a computer that does not support the fast re-connect procedure. If used with a computer supporting the fast re-connect procedure, the mouse could implement a power-management algorithm that suspends radio communication with the computer for time periods that may cause the mouse-computer radio connection to be broken. Upon need for transmission of data to the computer (e.g., the user moves the mouse after a period of no mouse use), the connection can be re-established sufficiently fast to avoid (or minimize) any perceived latency. If, however, the mouse is used with a computer not supporting a fast re-connect procedure, that power management algorithm would likely result in unacceptable latency.

Various systems and methods are known for automatic detection of a protocol by which a device communicates with a computer. U.S. Pat. Nos. 6,442,734 and 5,754,890, assigned to the assignee of the present invention, are two examples. However, neither these patents nor other known prior art describes optimizing (or otherwise modifying) a power management algorithm based on parameters of a communication link between devices, and in particular, based on parameters of a wireless communication connection.

SUMMARY OF THE INVENTION

Embodiments of the invention allow a wireless device to determine characteristics of a connection established (or being established) with a remote device, and to then implement a power management algorithm based on those characteristics. In one embodiment, a wireless device includes a battery power source, a radio transceiver powered by the battery, a memory and a controller. The controller is configured to create, via the transceiver, wireless connections with remote devices in any of a plurality of connection configurations. The controller detects the presence, in a wireless transmission from a remote device, of one or more parameters identifying one of the plurality of configurations. Based on the configuration identified, the controller implements one of a plurality of power management algorithms.

These and other features and advantages of the present invention will be readily apparent and fully understood from the following detailed description of preferred embodiments, taken in connection with the appended drawings.

DETAILED DESCRIPTION OF THE PREFERRED EMBODIMENTS

The present invention provides systems and methods by which a wireless device may detect information about a communication link with another device, and then adopt or modify a power management scheme. The invention is described by example of a desktop computer and wireless computer input device communicating under the BLUETOOTH standard. However, the invention is not limited to these specific types of devices or to the BLUETOOTH standard. The invention may also be implemented with numerous other general purpose or special purpose computing system environments or configurations, with other types of devices, and in devices communicating via other wireless communication standards and/or protocols.

Figure 1:
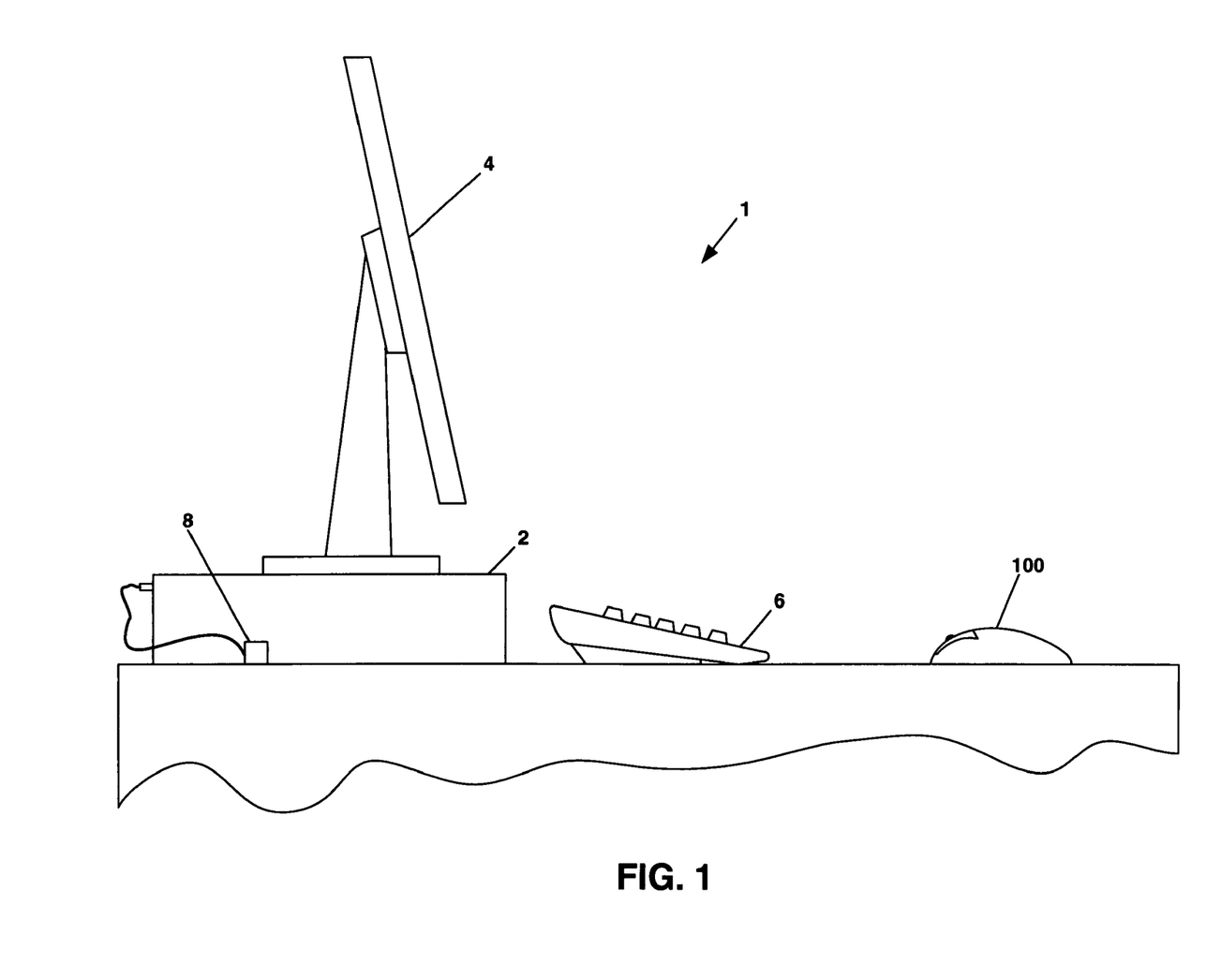
FIG. 1 is a view of a computing system environment implementing at least one embodiment of the invention.

FIG. 1 illustrates one example of a suitable computing system environment 1 in which the invention may be implemented. Shown in FIG. 1, in side view, are a desktop computer 2 having a monitor 4 and keyboard 6. Also shown is wireless mouse 100, which communicates with computer 2 via an RF transceiver within dongle 8. Dongle 8 is connected to a USB or other port of computer 2, and is located externally to computer 2 (as shown). In at least one embodiment, dongle 8 houses the required electronic components and firmware for receiving BLUETOOTH communications from and transmitting BLUETOOTH communications to remote devices (such as a mouse or keyboard). In at least one embodiment, components within dongle 8 convert received BLUETOOTH data to a format which may be passed to computer 2 via a USB port, and similarly convert USB data to a format which may be transmitted by BLUETOOTH link. In particular, dongle 8 contains components and firmware needed to implement the radio, baseband, link manager and L2CAP BLUETOOTH layers for computer 2. In other embodiments, electronic components and firmware for implementing BLUETOOTH communications may be internal to computer 2 and directly connected to a system or other bus without an intermediate USB connection.

Figure 2:
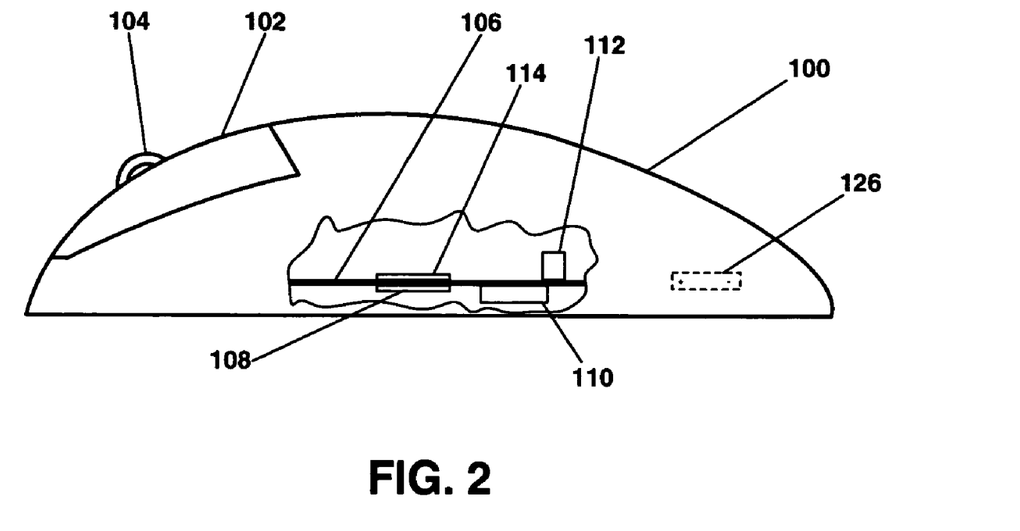
FIG. 2 is a cutaway side view of the wireless mouse of FIG. 1.

FIG. 2 is a side, cutaway view of mouse 100. Mouse 100 may have one or more buttons 102 which can be pressed by a user, a scroll wheel 104, or other types of input controls which can be actuated by a user. The number, arrangement and types of input controls shown are merely exemplary, and other combinations and arrangements are within the scope of the invention. The operation of switches, scroll wheels and other types of input controls is known in the art and thus not further described herein. Mouse 100 may also have one or more internal circuit boards 106 or other substrates upon which various electronic components are connected and physically supported. These components may include an imaging array 108, a LED or laser source 110, a RF antenna 112, a controller 114 and a battery/power source 126. Other components, not shown in FIG. 2, may include memory and other electrical components. LED or laser source 110 emits light which illuminates an area of a desktop or other surface, and which is imaged by imaging array 108. Images from array 108 are then compared to detect movement of mouse 100 across the desktop or other surface.

Figure 3:
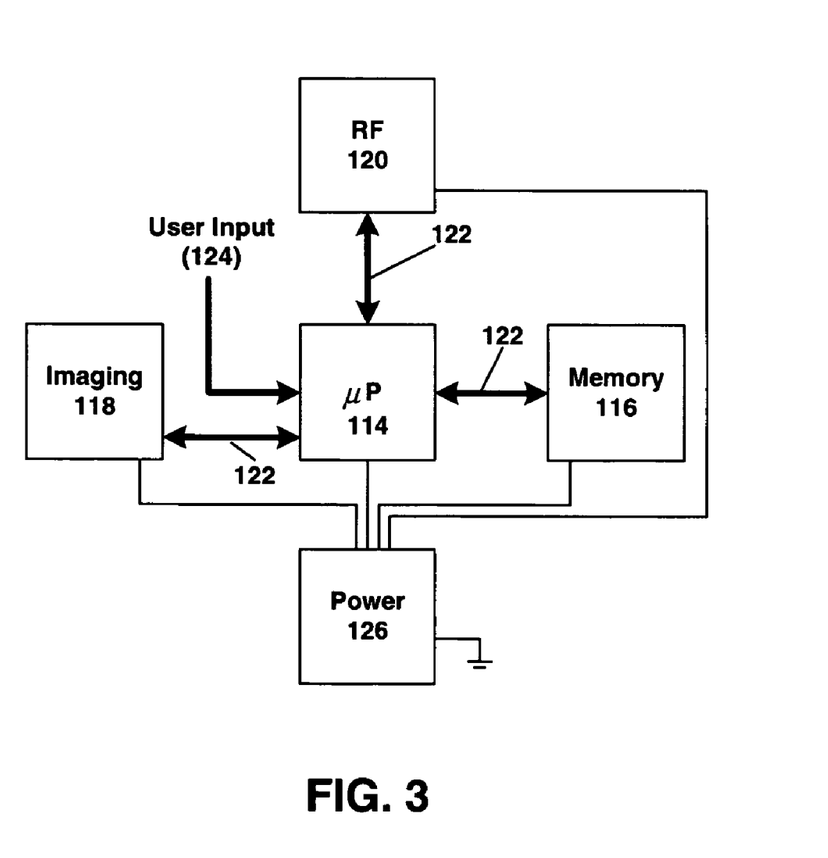
FIG. 3 is a block diagram for circuitry of the mouse of FIGS. 1 and 2.

FIG. 3 is a block diagram of the internal circuitry of mouse 100 according to one preferred embodiment of the invention. Operation of mouse 100 is controlled by a microprocessor (μP) controller 114. Although controller 114 is shown as a microprocessor, controller 114 could alternatively include state machine circuitry or other suitable components capable of controlling operation of mouse 100 as described herein. Controller 114 communicates with memory 116. Memory 116, which may include volatile and non-volatile memory, is a machine-readable medium used for storage of software (or firmware) instructions, imaging data and configuration settings (such as power management algorithms discussed in more detail below). Memory 116 may include a rewritable non-volatile component, such as battery-backed SRAM or EEPROM, and/or a non-rewritable component such as ROM. Controller 114 also controls LED or laser source 110 (FIG. 2) and imaging array 108 (FIG. 2), as well as other imaging elements, all of which are represented collectively by block 118. Controller 114 further controls RF communication circuitry 120, and passes data to RF communication circuitry 120 for communication to computer 2 over antenna 112 (FIG. 2). Similarly, data communicated to mouse 100 is received via antenna 112 (FIG. 2) and RF circuitry 120, and transmitted to controller 114. Controller 114 communicates with imaging elements 118, RF circuitry 120 and memory 116 over one or more buses 122, shown collectively as bold bi-directional arrows. Controller 114 also receives electrical signals that correspond to a user's actuation of a mouse button 102 (FIG. 2), scroll wheel 104 (FIG. 2) or other input control. These electrical signals are represented collectively by User Input 124. The various electrical components of mouse 100 are powered by a power source 126, which could include one or more batteries.

Although FIG. 3 shows controller 114, imaging circuitry 118, RF circuitry 120 and memory 116 as discrete components, this need not be the case. For example, one or more of these components might be contained in a single Integrated Circuit (IC) or other component. As another example, controller 114 may include internal program memory such as ROM. Similarly, the herein described functions of these components could be distributed across additional components (e.g., multiple controllers or other components).

The present invention permits mouse 100 to automatically implement a power management algorithm based on parameters of a wireless BLUETOOTH connection with computer 2. For purposes of explanation, two simplified power management algorithms are presented. It is understood, however, that devices according to other embodiments of the invention may have additional and/or more complex power management algorithms.

Figure 4:
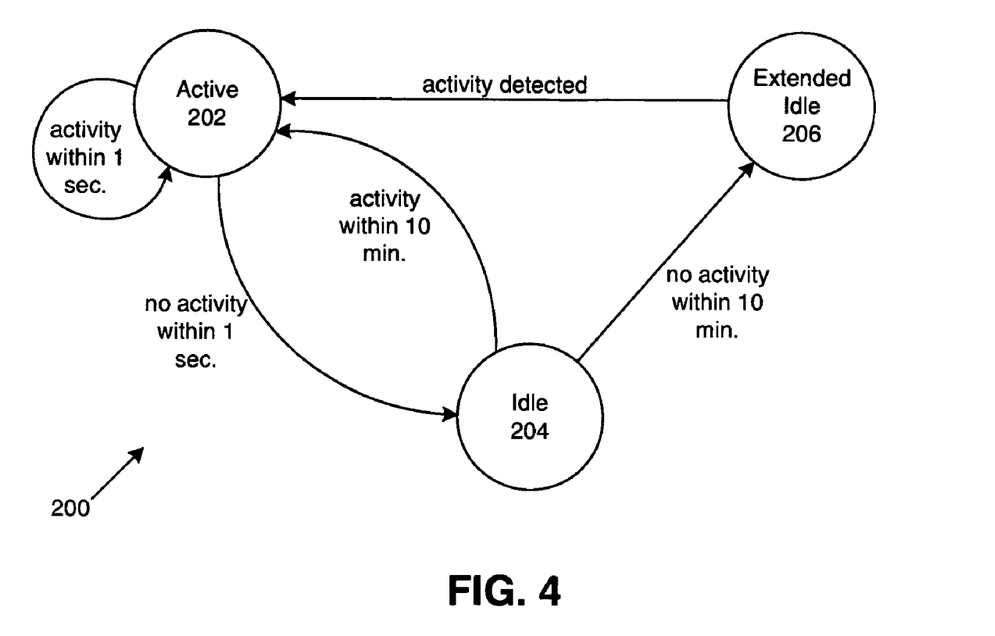
FIG. 4 is a state diagram showing an example power management algorithm.

First power management algorithm 200 is shown in the state diagram of FIG. 4. In Active state 202, mouse 100 is configured for immediate use. In other words, Active state 202 assumes that the user is currently moving the mouse, pressing mouse buttons or otherwise providing input to computer 2 with mouse 100. Controller 114 causes LED 110 (FIG. 2) and imaging array 108 (FIG. 2) to create images at a rapid rate. Controller 114 also causes RF circuitry 120 to transmit periodic messages to computer 2 (via dongle 8) containing data or to maintain the connection with computer 2.

After 1 second of no user activity, mouse 100 transitions to Idle state 204. As used herein, "no activity" includes circumstances when a user is not using the mouse to provide user data to computer 2. In other words, a user is not moving the mouse, pressing a mouse button or rotating a scroll wheel. In some embodiments, mouse 100 is equipped with a proximity sensor (not shown) able to detect the presence of a user hand on or near mouse 100. In such an embodiment, mouse 100 could be configured to treat non-proximity of a user hand as a "no activity" condition. In Idle state 204, Controller 114 causes LED 110 (FIG. 2) and imaging array 108 (FIG. 2) to create images at a reduced rate. Controller 114 also reduces the rate at which RF circuitry 120 transmits messages to computer 2. In particular, messages are only transmitted at an interval sufficiently short to ensure that latency is not noticeable if the user moves mouse 100, pushes a mouse button or otherwise resumes use of mouse 100. Because mouse 100 is in Idle state 204, there is no user data to transmit to computer 2. If there is mouse motion or other user activity while in Idle state 204, the corresponding user data is sent in the next scheduled Idle state transmission, after which mouse 100 returns to Active state 202. In one embodiment, RF messages are transmitted to computer 2 at the rate of one message every 70 milliseconds in Idle state 204. If mouse 100 senses activity (e.g., movement, button press, hand proximity) within 10 minutes after entering Idle state 204, mouse 100 returns to Active state 202. After 10 minutes of no activity, mouse 100 enters Extend Idle state 206. Upon entering Extended Idle state 206, controller 114 sends a message to dongle 8 terminating the connection; in other embodiments, dongle 8 terminates the connection with mouse 100 after mouse 100 has been in Extended Idle state 206 (and therefore not transmitted) longer than the timeout period of dongle 8. In Extended Idle state 206, controller 114 deactivates RF circuitry 120 and no longer transmits to (or listens for transmissions from) computer 2. The imaging rate is also further reduced. Upon sensing movement, a button push, hand proximity or other indication that mouse 100 is needed by a user, mouse 100 returns to Active state 202. If the connection with computer 2 has been terminated, it must be recreated prior to (or as part of) a return to Active state 202.

Figure 5:
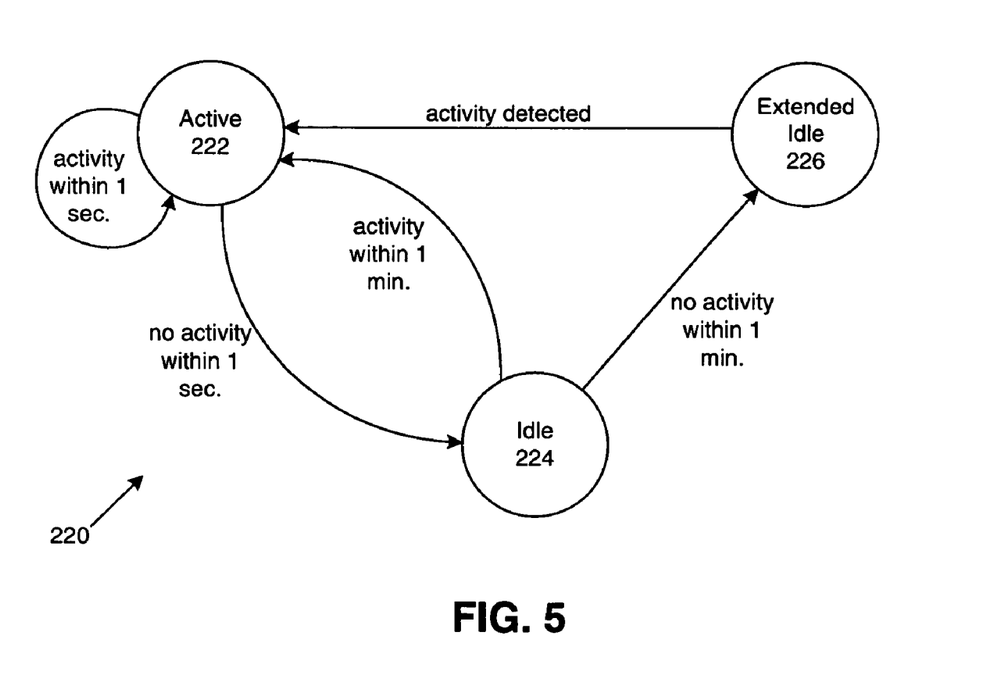
FIG. 5 is a state diagram showing another example power management algorithm.

FIG. 5 shows a second power management algorithm 220. Active state 222 is similar to Active state 202 of algorithm 200 (FIG. 4). The imaging components (LED 110 and imaging array 108) and RF circuitry 120 are activated at rapid rates. After 1 second of no activity, mouse 100 transitions to Idle state 224. Similar to Idle state 204 of algorithm 200, imaging and RF transmission rates are reduced. Unlike algorithm 200, however, mouse 100 remains in Idle state 224 for less time before transitioning to Extended Idle state 226. In one embodiment, mouse 100 transitions back to Active state 222 if activity is detected within 1 minute in Idle state 224. If no activity is detected after 1 minute, mouse 100 transitions to Extended Idle state 226. Similar to Extended Idle state 206 of algorithm 200, controller 114 deactivates RF circuitry 120 and no longer transmits to (or listens for transmissions from) computer 2 while in Extended Idle state 226. Upon detection of user activity, mouse 100 returns to Active state 222. Upon entering Extended Idle state 226, mouse 100 will have terminated the connection with dongle 8, and the connection must be reestablished prior to (or as a part of) return to Active state 222.

As can be appreciated from the preceding description, algorithm 220 allows mouse 100 to more quickly deactivate RF circuitry 120, thereby saving power. However, this comes at a cost of more frequently reestablishing the connection with computer 2. If the time to reestablish this connection is too long, the user will perceive a delay between the time he or she attempts to resume input with mouse 100 and the time that the input is acknowledged by computer 2. In some cases this may only be an annoyance, while in other cases it may actually result in data loss (e.g., a mouse click might not be detected by computer 2, and the user might not realize this non-detection).

Figure 6:
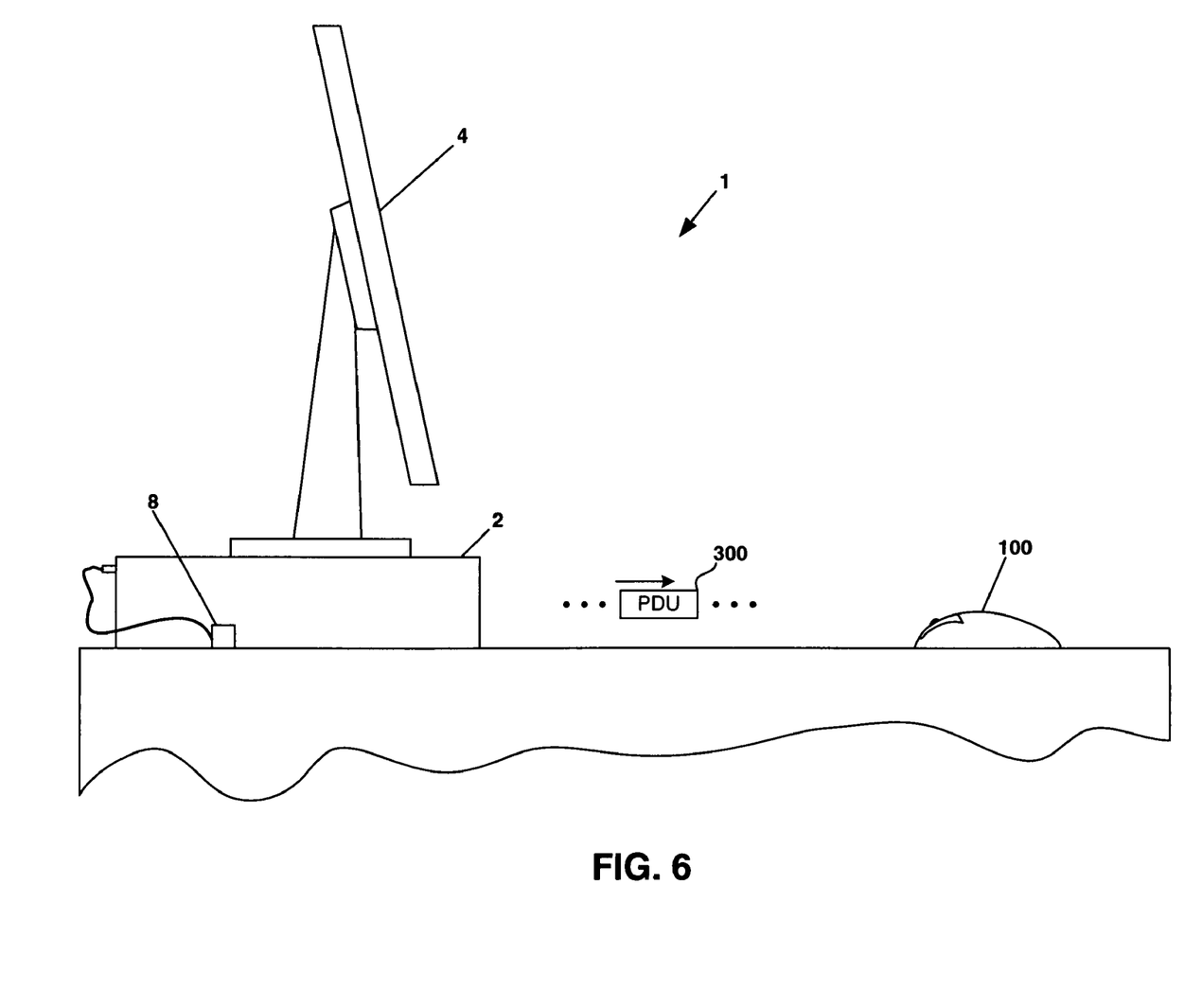
FIG. 6 illustrates transmission of a protocol data unit to a wireless mouse.

Accordingly, and as further illustrated with FIG. 6, mouse 100 chooses between power management algorithms 200 and 220 based on one or more parameters of a connection created between mouse 100 and computer 2. When a connection between mouse 100 and computer 2 is initially established, a series of messages are transmitted between mouse 100 and dongle 8. The content, format, sequence and other details of these messages are described in the previously-referenced BLUETOOTH documents, and thus not further described herein. As part of these messages, various Link Manager (LM) protocol data units (PDU) 300 are transmitted from dongle 8 to mouse 100. Contained within one or more PDUs 300 are data identifying features supported by dongle 8 and/or computer 2. Many such features are specific to version 1.1 or to version 1.2 of the BLUETOOTH standard, or to a proprietary feature that may be supported by dongle 8 and/or computer 2. For example, Adaptive Frequency Hopping (AFH) is one feature supported by BLUETOOTH version 1.2 but not by version 1.1. If dongle 8 is a BLUETOOTH version 1.2 device, it will enable AFH by issuing (within a PDU 300) a LMP_set_AFH command. If mouse 100 receives such a command, controller 114 thereby determines that computer 2 is communicating via the BLUETOOTH version 1.2 standard.

In at least one embodiment, the default reconnection times for BLUETOOTH version 1.2 is within acceptable limits of latency of mouse 100. For example, mouse 100 may be designed for (or configured for) use by an individual more willing to accept some degree of latency in return for longer battery life. In this embodiment, controller 114 is programmed to implement power management algorithm 220 upon detection of a parameter indicative of a BLUETOOTH v1.2 connection with a computer, and to otherwise implement power management algorithm 200. In another embodiment, mouse 100 is designed (or configured) for a user who is unwilling to accept a degree of latency associated with the default reconnection time of BLUETOOTH v1.2. In this embodiment, however, mouse 100 is further equipped with hardware and/or firmware that permit mouse 100 to reconnect more quickly than the default BLUETOOTH v1.2 connection time, so long as the connection is established with another device that is also equipped with the required hardware and/or firmware. If a mouse 100 in this embodiment receives a PDU 300 from dongle 8 indicating that dongle 8 has the required hardware and/or firmware, controller 114 implements power management algorithm 220. Otherwise, mouse 100 implements power management algorithm 200.

Figure 7:
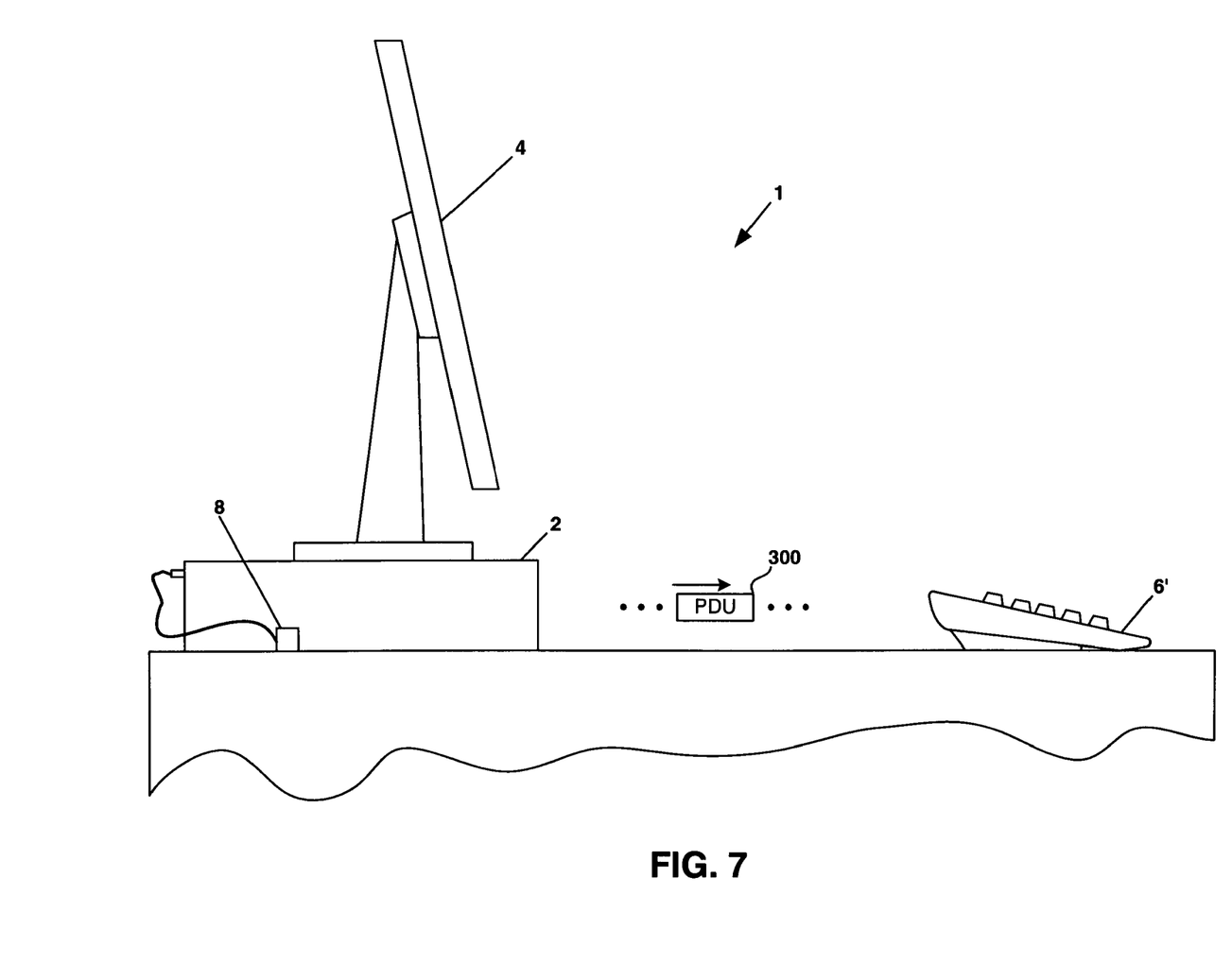
FIG. 7 illustrates transmission of a protocol data unit to a wireless keyboard.
Figure 8:
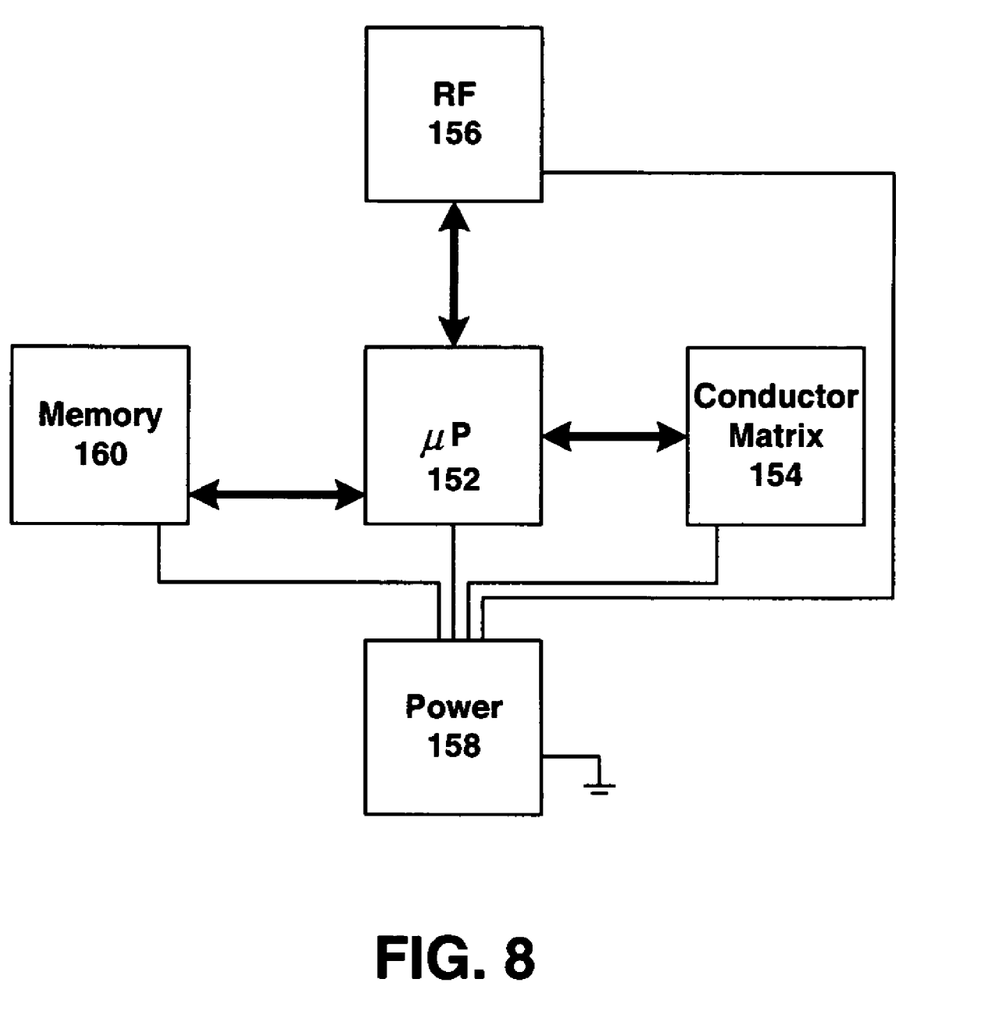
FIG. 8 is a block diagram for circuitry of a wireless keyboard according to at least one embodiment of the invention.

As previously indicated, the invention is not limited to computer mice. FIG. 7 shows a computer keyboard 6' according to another embodiment of the invention. FIG. 8 is a block diagram for internal circuitry for keyboard 6' according to one embodiment of the invention. Operation of keyboard 6' is controlled by microprocessor 152. Microprocessor 152 scans for one or more presses (or releases) of a key by scanning key conductor matrix 154, and upon detecting a key press (or release), causes the appropriate make or break code(s) to be transmitted by RF circuitry 156. Microprocessor 152 also communicates with memory 160, upon which power management algorithms 200 and 220 are stored. Microprocessor 152 and other components of keyboard 6' are powered by battery 158. In one embodiment, microprocessor 152, upon receiving a PDU 300' (FIG. 7) indicating computer 2 communicates via BLUETOOTH v1.2, implements power management algorithm 220. Otherwise, microprocessor implements power management algorithm 200. In another embodiment, keyboard 6' is further equipped with hardware and/or firmware that permit keyboard 6' to reconnect more quickly than the default BLUETOOTH v1.2 connection time, so long as the connection is established with another device that is also equipped with the required hardware and/or firmware. If a keyboard 6' of this embodiment receives a PDU 300' from dongle 8 indicating that dongle 8 has the required hardware and/or firmware, microprocessor 152 implements power management algorithm 220. Otherwise, keyboard 6' implements power management algorithm 200.

Figure 9:
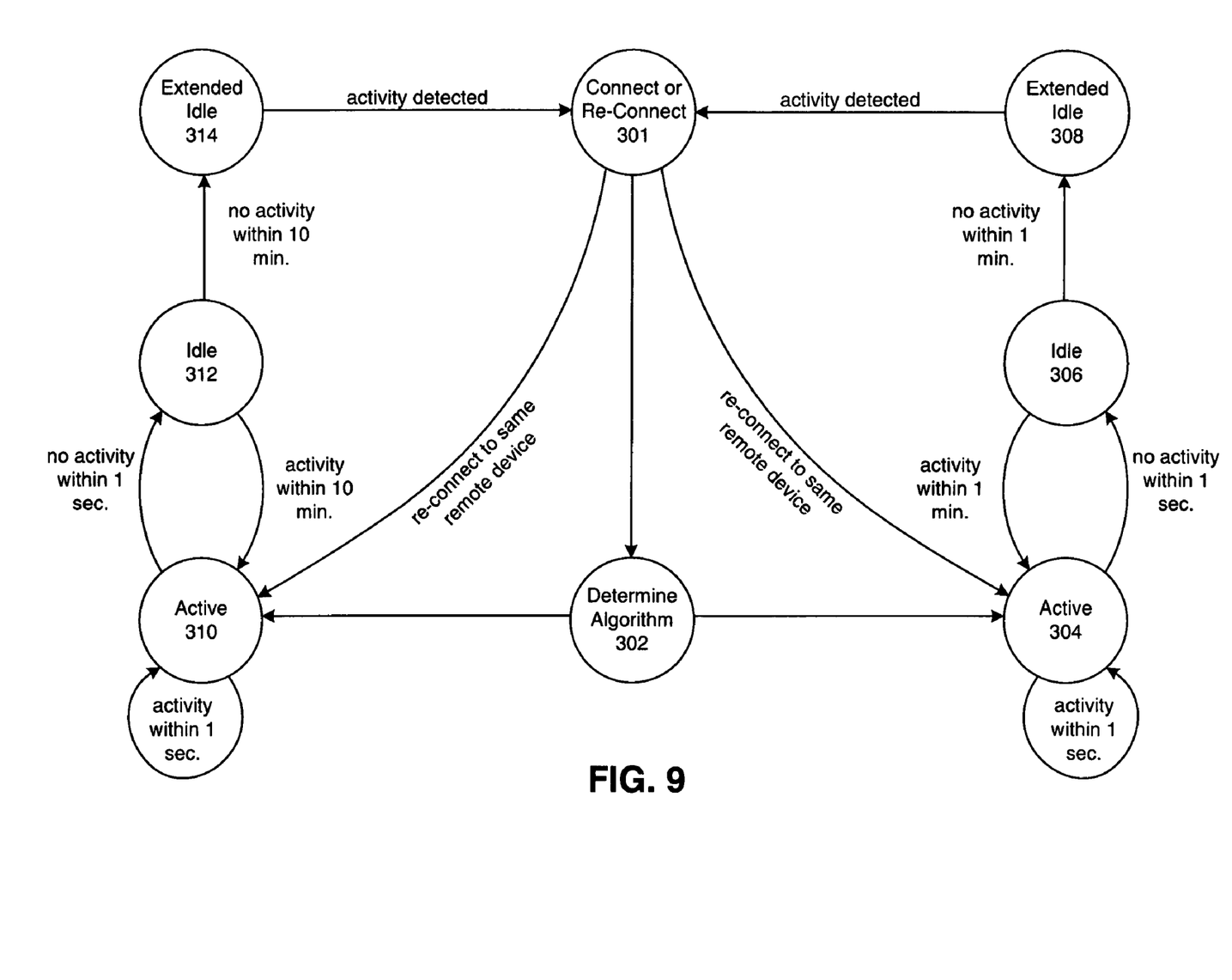
FIG. 9 is a state diagram for a wireless computer input device according to at least one embodiment of the invention.

FIG. 9 is a state diagram for a controller (such as controller 114 of FIG. 3 or microprocessor 152 of FIG. 8) of an input device configured to operate in accordance with at least one embodiment of the invention. FIG. 9 combines FIGS. 4 and 5 in certain respects. In state 301, the controller is establishing (or re-establishing) a connection with another BLUETOOTH device. When initially establishing the connection, the controller receives one or more PDUs providing parameters for the connection. In state 302, the controller determines, based on parameters identified in state 301, which power management algorithm to implement. If the parameters of the connection correspond to a connection type that supports sufficiently fast re-establishment of a connection, a first (more power-conserving) algorithm is implemented. In particular, the controller places the input device in Active state 304, which is similar to active state 222 (FIG. 5). After 1 second of no activity, the controller transitions the input device to Idle state 306, which is similar to Idle state 224 of FIG. 5. The input device transitions back to Active state 304 if activity is detected within 1 minute in Idle state 306. If no activity is detected after 1 minute, the input device transitions to Extended Idle state 308. Similar to Extended Idle state 226 of algorithm 220, the controller deactivates RF circuitry and no longer transmits to (or listens for transmissions from) from a remote device while in Extended Idle state 308. Upon detection of user activity, the controller transitions the input device to state 301 and establishes or re-establishes a connection. If the connection is a re-established connection with the same remote device, this is determined in state 301, the various connection parameters (previously received when initially establishing the connection) are not retransmitted, and the input device transitions directly from state 301 to state 304. If the connection is with another remote device, the connection parameters for the new remote device are received, and a determination is made at state 302 as to whether the newly connected remote device supports a sufficiently fast re-establishment of a connection. If so, the input device again transitions to state 304.

If it is determined in state 302 after initially establishing a connection with a remote device that the parameters of the just-established connection do not correspond to a connection type supporting sufficiently fast re-establishment of a connection, a second (less power-conserving) algorithm is implemented. In particular, the controller places the input device in Active state 310, which is similar to active state 202 (FIG. 4). After 1 minute of no activity, the controller transitions the input device to Idle state 312, which is similar to Idle state 204 of FIG. 4. The input device transitions back to Active state 310 if activity is detected within 10 minutes in Idle state 312. If no activity is detected after 10 minutes, the input device transitions to Extended Idle state 314. Similar to Extended Idle state 206 of algorithm 200, the controller deactivates RF circuitry and no longer transmits to (or listens for transmissions from) from a remote device while in Extended Idle state 314. Upon detection of user activity, the controller transitions the input device to state 301 and establishes or re-establishes a connection. If the connection is a re-established connection with the same remote device, the input device returns to Active state 310 directly from state 301.

Figure 10:
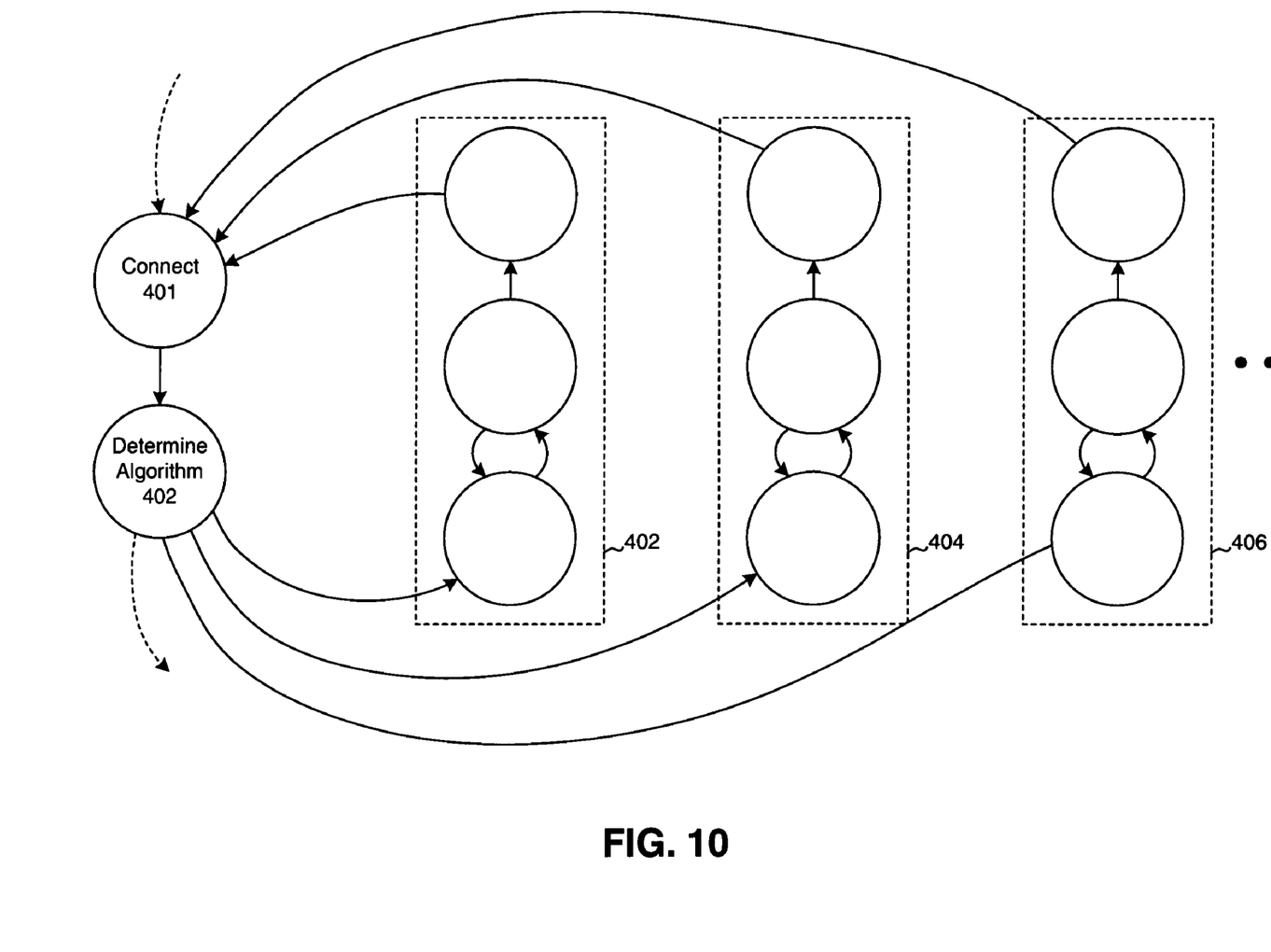
FIG. 10 is a state diagram for a wireless computer input device according to another embodiment of the invention.

FIG. 10 is a state diagram for a computer input device according to another embodiment of the invention. Similar to state 301 of FIG. 9, a controller of a device according to FIG. 10 establishes (or re-establishes) a connection with another BLUETOOTH device in state 401. As part of establishing the connection, the controller receives one or more PDUs providing parameters for the connection. In state 402, and similar to state 302 of FIG. 9, the controller determines, based on parameters identified in state 401, which power management algorithm to implement. In the embodiment of FIG. 10, however, the controller selects from three or more power management algorithms 404, 406, 408, etc.

Although specific examples of carrying out the invention have been described, those skilled in the art will appreciate that there are numerous variations and permutations of the above described systems and techniques that fall within the spirit and scope of the invention as set forth in the appended claims. These and other modifications are within the scope of the invention as defined by the attached claims.

The invention claimed is:

1. A device comprising:
a battery power source;
a radio transceiver powered by the battery and having components for transmission and receipt of data;
a memory having instructions stored thereon, the instructions including a plurality of power management algorithms; and
a controller coupled to the transceiver and to the memory and configured to execute the instructions so as to
create, via the transceiver, wireless connections with remote devices in any of a plurality of connection configurations,
detect the presence, in a wireless transmission from a remote device, of one or more parameters identifying one of the plurality of configurations,
implement, based on the configuration identified, one of the plurality of power management algorithms,
implement, upon determining the presence of the at least one parameter, a power management algorithm of the plurality in which the transceiver is deactivated after a first period of device inactivity, and
implement, upon determining the absence of the at least one parameter, a power management algorithm of the plurality in which the transceiver is deactivated after a second period of device inactivity, the second period being longer than the first period.

2. The device of claim 1, wherein the controller is configured to detect the presence of one or more parameters by determining if a wireless connection with the remote device has at least one parameter corresponding to an acceptably fast re-connection procedure.

3. The device of claim 1, wherein the controller is configured such that the device is inactive if the device is not being used to generate or transmit data based on input from a human user of the device.

4. The device of claim 1, wherein the controller is further configured detect the presence of one or more parameters at the time of establishing a wireless connection with a remote device.

5. The device of claim 1, wherein the plurality of power management algorithms comprises three or more power management algorithms.

6. The device of claim 1, wherein the device is a computer input device.

7. The device of claim 6, wherein the device is a computer mouse.

8. The device of claim 6, wherein the device is a computer keyboard.

9. A method for automatically selecting a power management algorithm in a battery-powered wireless device capable of creating wireless connections with a remote device in any of a plurality of connection configurations, comprising:
establishing a wireless connection with a remote device;
determining wireless communication features supported by the remote device;
implementing a first power management algorithm if the remote device supports a first communication feature;
implementing a second power management algorithm if the remote device does not support the first feature,
wherein the first power management algorithm comprises deactivating a transceiver after a first period of wireless device inactivity, and the second power management algorithm comprises deactivating the transceiver after a second period of wireless device inactivity, the second period being longer than the first period.

10. The method of claim 9, wherein the first communication feature comprises support for an acceptably fast re-connection procedure.

11. The method of claim 9, wherein the wireless device is inactive if the wireless device is not being used to generate or transmit data based on input from a human user.

12. The method of claim 9, further comprising:
implementing a third power management algorithm if the remote device does not support the first feature but supports a second feature.

13. The method of claim 9, wherein said determining wireless communication features comprises determining wireless communication features at the time of establishing a wireless connection with a remote device.

14. A machine-readable medium having stored thereon data representing sequences of instructions which, when executed by a processor, cause the processor to perform steps comprising:
establishing, from a battery-powered wireless device capable of creating wireless connections with a remote device in any of a plurality of connection configurations, a wireless connection with a remote device;
determining wireless communication features supported by the remote device;
implementing a first power management algorithm if the remote device supports a first communication feature; and
implementing a second power management algorithm if the remote device does not support the first feature,
wherein the first power management algorithm comprises deactivating a transceiver after a first period of wireless device inactivity, and the second power management algorithm comprises deactivating the transceiver after a second period of wireless device inactivity, the second period being longer than the first period.

15. The machine-readable medium of claim 14, wherein the first communication feature comprises support for an acceptably fast re-connection procedure.

16. The machine-readable medium of claim 14, wherein the wireless device is inactive if the wireless device is not being used to generate or transmit data based on input from a human user.

17. The machine-readable medium of claim 14, comprising further sequences of instructions which cause the processor to perform steps comprising:
implementing a third power management algorithm if the remote device does not support the first feature but supports a second feature.

18. The machine-readable medium of claim 14, wherein said determining wireless communication features comprises determining wireless communication features at the time of establishing a wireless connection with a remote device.

19. A computer input device comprising:
a battery power source;
a radio transceiver powered by the battery and having components for transmission and receipt of data; and a controller coupled to the transceiver, wherein the computer input device is configured to establish a wireless connection with a remote device, determine wireless communication features supported by the remote device, implement a first power management algorithm if the remote device supports a first communication feature, and implement a second power management algorithm if the remote device does not support the first feature, wherein the first power management algorithm comprises deactivating a transceiver after a first period of wireless device inactivity, and the second power management algorithm comprises deactivating the transceiver after a second period of wireless device inactivity, the second period being longer than the first period.

20. The computer input device of claim 19, wherein the first communication feature comprises establishing a re-connection in a reduced amount of time.

21. The device of claim 1, wherein the plurality of power management algorithms includes first and second algorithms, each of the first and second algorithms defines multiple device states, each of the device states defining a rate at which the device communicates with a remote device and a rate at which user input components of the device are operated, the first algorithm defines a transition between two of the device states of that algorithm based on an absence of user input within a first predetermined time period, and the second algorithm defines a transition between two of the device states of that algorithm based on an absence of user input within a second predetermined time period, wherein and the second time period is different from the first time period.

22. The device of claim 21, wherein the first algorithm defines active, idle and extended idle states, the first algorithm defines transition from the active state to the idle state upon an absence of user input for the first time period and a transition from the idle state to the extended idle state upon an absence of user input for a third time period, wherein the third time period is longer than the first time period, the active state defines a first rate of communication with a remote device and a first rate of user input component operation, the idle state defines a second rate of communication with a remote device and a second rate of user input component operation, the second rate of communication being slower that the first rate of communication and the second rate of user input component operation being slower than the first rate of user input component operation, the extended idle state defines a zero rate of communication with a remote device and a third rate of user input component operation, the third rate of user input component operation being slower than the first rate of user input component operation, the second algorithm also defines the active, idle and extended idle states, and the second algorithm defines transition from the active state to the idle state upon an absence of user input for the second time period and a transition from the idle state to the extended idle state upon an absence of user input for a fourth time period, wherein the fourth time period is longer than the second time period.

23. The device of claim 22, wherein the device is a computer mouse, and the user input device component operation rates are rates at which a light source and an imaging array are activated.

\* \* \* \* \*